US012665439B2

(12) United States Patent
Reed et al.

(10) Patent No.: US 12,665,439 B2
(45) Date of Patent: Jun. 23, 2026

(54) WIRELESS POWER SYSTEM FOR PORTABLE ELECTRICAL DEVICES ON MARINE VESSELS AND LAND VESSELS

(71) Applicant: SCANSTRUT LIMITED, Exeter (GB)

(72) Inventors: Thomas Charles Reed, Exeter (GB); George Bowles, Exeter (GB)

(73) Assignee: SCANSTRUT LIMITED, Exeter (GB)

( * ) Notice: Subject to any disclaimer, the term of this patent is extended or adjusted under 35 U.S.C. 154(b) by 0 days.

(21) Appl. No.: 18/854,029

(22) PCT Filed: Apr. 6, 2023

(86) PCT No.: PCT/GB2023/050941
§ 371 (c)(1),
(2) Date: Oct. 3, 2024

(87) PCT Pub. No.: WO2023/194749
PCT Pub. Date: Oct. 12, 2023

(65) Prior Publication Data
US 2025/0233453 A1     Jul. 17, 2025

Related U.S. Application Data

(60) Provisional application No. 63/328,517, filed on Apr. 7, 2022.

(51) Int. Cl.
H02J 50/00 (2016.01)
H02J 50/10 (2016.01)
H02J 50/90 (2016.01)

(52) U.S. Cl.
CPC ............ H02J 50/005 (2020.01); H02J 50/10 (2016.02); H02J 50/90 (2016.02)

(58) Field of Classification Search
CPC ........... H02J 50/005; H02J 50/90; H02J 50/10
(Continued)

(56) References Cited

U.S. PATENT DOCUMENTS 8,253,377 B2 * 8/2012 Meincke .............. H04R 25/602
                                                          320/115
10,424,955 B2 * 9/2019 Higgins ............. H01R 13/2414
(Continued)

FOREIGN PATENT DOCUMENTS

CN       113162247 A     7/2021
WO    2011116394 A1     9/2011

OTHER PUBLICATIONS

PCT International Search Report dated Jun. 12, 2023 from the European Patent Office.

*Primary Examiner* — Alfonso Perez Borroto
(74) *Attorney, Agent, or Firm* — DeLio Peterson & Curcio LLC; Kelly M. Nowak

(57) ABSTRACT

A system for wirelessly powering an electrical device in a wet or outdoor environment from a wireless transmitter sealed to a mounting surface. The electrical device is in a portable housing removable from the surface, and includes a wireless receiver adjustably disposed in the housing to change the position of and to fix the receiver in a desired position within the housing. The receiver and housing are adapted to be positioned adjacent the transmitter. The position of the receiver within the housing may be adjusted to create a desired spacing distance between the receiver and the transmitter and the receiver locked within the housing to fix the position of the receiver within the housing at the desired spacing distance with the transmitter. This then permits wireless transfer of electrical energy via an electromagnetic field from the transmitter to the receiver to provide power to the electrical device.

20 Claims, 18 Drawing Sheets

(58) Field of Classification Search
USPC .......................................................... 307/104
See application file for complete search history.

(56) References Cited

U.S. PATENT DOCUMENTS

| | | | |
|---|---|---|---|
| 2014/0143933 A1 | 5/2014 | Low et al. | |
| 2016/0272072 A1 | 9/2016 | Huang et al. | |
| 2020/0260176 A1* | 8/2020 | Baltensperger | ........ H04R 25/55 |
| 2021/0168536 A1* | 6/2021 | Nielsen | ................ H04R 25/554 |
| 2021/0385591 A1* | 12/2021 | Nielsen | ................ H04R 25/554 |

* cited by examiner

WIRELESS POWER SYSTEM FOR PORTABLE ELECTRICAL DEVICES ON MARINE VESSELS AND LAND VESSELS

CROSS REFERENCE TO RELATED APPLICATIONS

This invention disclosure claims priority from U.S. provisional patent application no. 63/328,517 filed Apr. 7, 2022.

TECHNICAL FIELD

This invention relates to a system and method to receive power wirelessly in an electrical device in a wet, harsh, or outdoor environment, for example, a lighting device used on a marine vessel or land recreational vehicle.

BACKGROUND ART

Electrical devices used on marine vessels or land recreational vehicle are generally exposed to a wet, harsh, or outdoor environment, and have to be manufactured for use in such environments. Power transmission to such devices, for example, lamps and other lighting devices used in the leisure marine market, is challenging since wired connectors are subject to corrosion resistance, particularly if such devices are to be portable, i.e., easily moved to different locations having available power. Wireless power transmission has been used in wet, harsh, or outdoor environment to power phones, for example, by embedding a waterproofed wireless power transmitter coil in a fixed position under a surface, so that the mobile phone may be placed over the transmitter and the battery charged.

It would be beneficial to be able to provide wirelessly and with adequate waterproofing live D.C. power to an electrical device, i.e., power to a device being actively used (other than mere battery charging), in a wet, harsh, or outdoor environment without the use of exposed terminals, to avoid corrosion issues therewith. This would be beneficial for powered devices that do not need to contain their own battery power source and yet may be portable, i.e., easily moved from a between positions with power and to storage.

DISCLOSURE OF INVENTION

Bearing in mind the problems and deficiencies of the prior art, it is therefore an object of the present invention to provide an improved system and method to receive power wirelessly in an electrical device in a wet, harsh, or outdoor environment.

It is another object of the present invention to provide an improved system and method for delivering live D.C. power to an electrical device, i.e., power to a device being actively used and other than mere battery charging, in a wet, harsh, or outdoor environment without the use of exposed terminals, to avoid corrosion issues therewith.

A further object of the invention is to provide an improved system and method for powering devices that do not need to contain their own battery power source and are portable, i.e., easily moved from a between positions with power and to storage.

It is yet another object of the present invention to provide an improved system and method for powering lighting devices used on a marine vessel or land recreational or other vehicle.

Still other objects and advantages of the invention will in part be obvious and will in part be apparent from the specification.

The above and other objects, which will be apparent to those skilled in the art, are achieved in the present invention which is directed to a method of wirelessly powering an electrical device in a wet, harsh, or outdoor environment. The method comprises providing a transmitter having a primary circuit capable of creating an electromagnetic field to transfer electrical energy wirelessly to a secondary circuit. The transmitter is sealed to a mounting surface to make a watertight, corrosion resistant seal with the surface. An electrical device requiring the energy is provided in a portable housing removable from the surface. There is further provided a receiver having a secondary circuit capable of receiving electrical energy wirelessly from the primary circuit of the transmitter, the receiver being adjustably disposed in the electrical device housing, the receiver being adjustable within the housing to change the position of the receiver within the housing. The method then includes positioning the receiver and housing adjacent the transmitter, adjusting the position of the receiver within the housing to create a desired spacing distance between the receiver and the transmitter, and wirelessly transferring electrical energy via an electromagnetic field from the transmitter to the receiver to provide power to the electrical device in the portable housing.

The present invention also provides a method of wirelessly powering an electrical device in a wet, harsh, or outdoor environment comprising providing a transmitter having a primary circuit capable of creating an electromagnetic field to transfer electrical energy wirelessly to a secondary circuit, the transmitter being in a mounting surface. The method also comprises providing an electrical device requiring the energy in a portable housing removable from the surface, and providing a receiver having a secondary circuit capable of receiving electrical energy wirelessly from the primary circuit of the transmitter. The method further comprises determining a desired spacing distance between the receiver and the transmitter when the receiver and housing are in a final position adjacent the transmitter, and positioning the receiver in the housing to provide the desired spacing distance between the receiver and the transmitter. The method then includes positioning the receiver and housing adjacent the transmitter. The receiver may then receive wirelessly transferring electrical energy via an electromagnetic field from the transmitter to provide power to the electrical device in the portable housing.

In another aspect the present invention further provides a system for wirelessly powering an electrical device in a wet, harsh, or outdoor environment from a transmitter having a primary circuit capable of creating an electromagnetic field to transfer electrical energy wirelessly to a secondary circuit. The transmitter may be sealed to a mounting surface to make a watertight, corrosion resistant seal with the surface. The system includes an electrical device requiring the energy in a portable housing removable from the surface, and a receiver having a secondary circuit capable of receiving electrical energy wirelessly from the primary circuit of the transmitter. The receiver is adjustably disposed in the housing to change the position of the receiver within the housing and to fix the receiver in a desired position within the housing. The receiver and housing are adapted to be positioned adjacent the transmitter. The position of the receiver within the housing may be adjusted to create a desired spacing distance between the receiver and the transmitter and the receiver locked within the housing to fix the position of the receiver within the housing at the desired spacing distance with the transmitter. This then permits wireless transfer of electrical energy via an electromagnetic field from the transmitter to the receiver to provide power to the electrical device.

The electrical device may have no battery power source in the housing.

The receiver may be locked within the housing to fix the position of the receiver within the housing at the desired spacing distance with the transmitter. The receiver and housing may have complimentary mounts to permit adjustment of the position of the receiver with respect to the housing and create the desired spacing distance and alignment between the receiver and the transmitter. The receiver and housing mounts may have complimentary threads to permit rotation of the receiver with respect to the housing.

The receiver and housing may have complimentary fittings or fasteners to create the desired spacing distance between the receiver and the transmitter. The receiver and transmitter may have respective spaced flat surfaces, and the housing is adjustable to align the receiver and transmitter spaced flat surfaces parallel to each other.

The transmitter may be secured to the surface in a fixed position and the receiver and housing may be removably positionable over the transmitter, and the receiver and housing may be positioned by hand from a location remote from the transmitter to a position above the transmitter on the surface to provide live power to the electrical device.

The transmitter may be secured to the surface in a fixed position and the receiver and housing may be rotatable with respect to the transmitter, and the receiver and housing may be rotated from a position remote from the transmitter to a position adjacent the transmitter on the surface to provide live power to the electrical device.

The transmitter may be secured to the surface in a fixed position and the receiver and housing may be secured to the electrical device which is slidable with respect to the transmitter, and the receiver and housing may be slid from a position remote from the transmitter to a position adjacent the transmitter on the surface to provide live power to the electrical device.

The housing may bias the receiver against the transmitter when the housing is moved from a position remote from the transmitter to a position adjacent the transmitter on the surface.

The electrical device may be an electric light and the transmitter may be mounted to the surface on a marine vessel or recreational vehicle exposed to a wet, harsh, or outdoor environment.

The present invention further provides a portable electrical device which may be wirelessly powered from a wireless power transmitter on a surface in a wet, harsh, or outdoor environment. The device comprises a housing having an electrical device requiring power, the housing being adapted to be positioned adjacent or on the surface having the wireless power transmitter, the housing having no battery power source. The device also comprises a receiver disposed in the housing having a secondary circuit capable of receiving electrical energy wirelessly from the primary circuit of the transmitter. The position of the receiver is adjustable when the housing is positioned adjacent to or over the wireless power transmitter to create a desired spacing distance between the receiver and the transmitter and fixed within the housing at the desired spacing distance. The device permits wireless transfer of electrical energy via an electromagnetic field from the transmitter to the receiver to provide power to the electrical device.

In yet another aspect the present invention provides a housing and receiver for a portable electrical device which may be wirelessly powered from a wireless power transmitter on a surface in a wet, harsh, or outdoor environment. The housing is adapted to be secured to an electrical device requiring power and positioned adjacent to or on the surface having the wireless power transmitter. The housing includes a receiver disposed therein having a secondary circuit capable of receiving electrical energy wirelessly from the primary circuit of the transmitter. The position of the receiver is adjustable prior to or when the housing is positioned adjacent to or over the wireless power transmitter to create a desired spacing distance between the receiver and the transmitter and fixed within the housing at the desired spacing distance. The housing permits wireless transfer of electrical energy via an electromagnetic field from the transmitter to the receiver to provide power to the electrical device.

In the either of the aforedescribed electrical device or the housing the receiver may be cylindrical with threads on an outer surface thereof, and the housing may have threads complimentary to the receiver threads. The receiver may be threaded in and rotatable with respect to the housing to adjust the spacing distance between the receiver and the transmitter.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing embodiments of the present invention, reference will be made herein to FIGS. 1-21 of the drawings in which like numerals refer to like features of the invention.

The present invention provides a system and method for employing a wireless receiver that is adapted to receive from a waterproof transmitter power source power to concurrently provide live D.C. power to an electrical device, i.e., power to a device being actively used (other than mere battery charging), in surroundings or atmosphere that may be wet, harsh, or an outdoor environment without the use of exposed terminals, to avoid corrosion issues therewith. The wireless power system employs a transmitter coil and receiver coil that transfer power wirelessly via electromagnetic induction. The system requires no physical contact, which is an advantage over a traditional electrical connector in the leisure marine market for corrosion resistance and usability. The powered devices containing the receiver and coil do not need to contain their own battery power source and yet may be portable, i.e., easily moved from a position to be powered adjacent the transmitter and coil, to a different position to be powered adjacent another transmitter and coil, or moved to storage.

Figure 5:
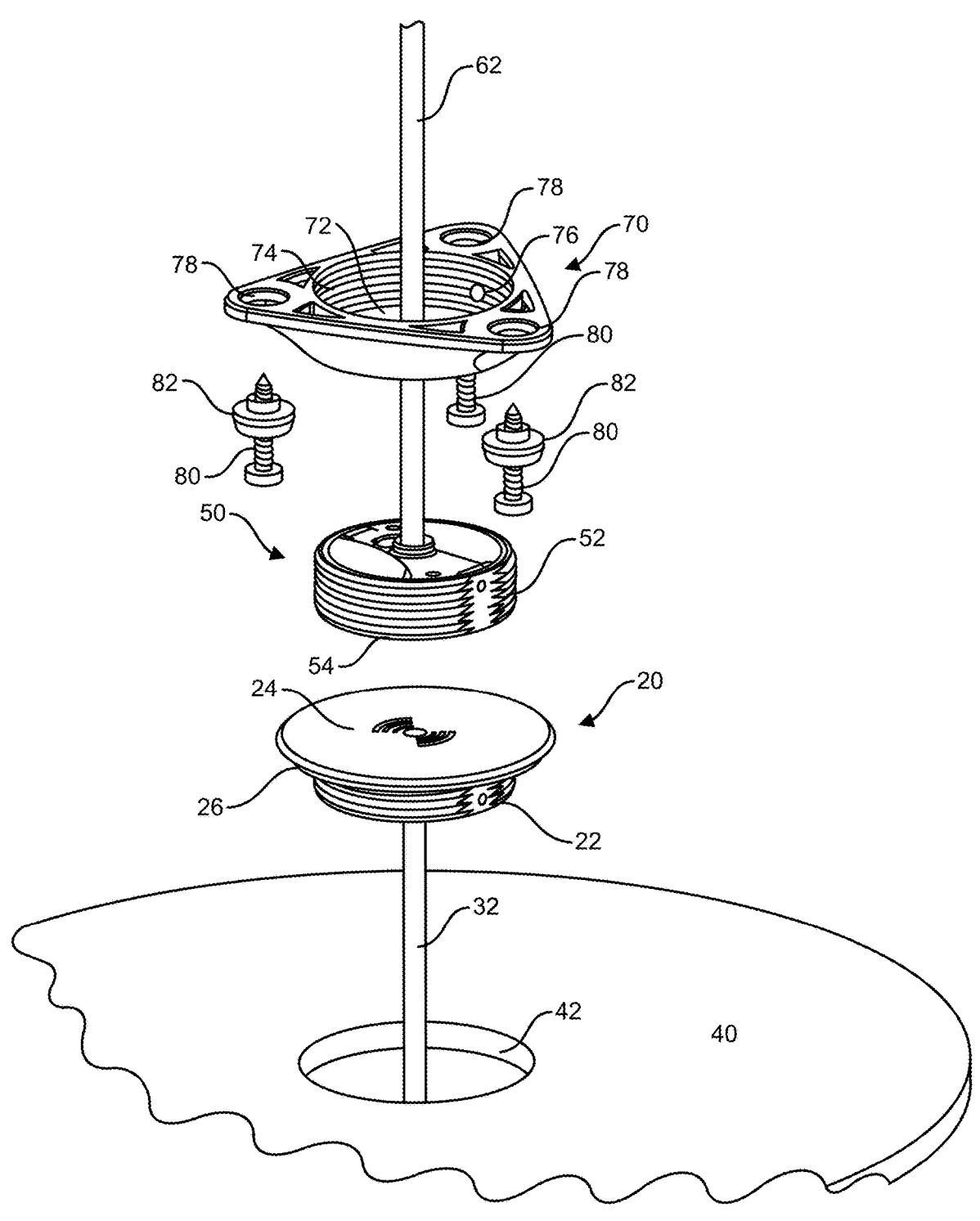
FIG. 5 is an exploded perspective view of the receiver of FIG. 1 in a system of the present invention including the receiver housing and the wireless power transmitter for mounting in a surface of a vessel or land vehicle.

In an embodiment of the system of the present invention, there may be employed a prior art wireless energy waterproof transmitter 20 as shown in FIG. 5 having a primary circuit capable of creating an electromagnetic field to transfer electrical energy wirelessly by induction to a secondary circuit. The waterproof transmitter 20 has a puck-shaped waterproof body 22 (i.e., a waterproof housing or transmitter boy), with threads 34 on the exterior cylindrical walls of the body, and a flat top surface 24. The waterproof transmitter body 22 contains the primary coils and other circuit components 30 to create the electromagnetic field necessary to transfer the electrical energy. A power cord 32 delivers the electrical power to the transmitter circuitry 30. The waterproof transmitter 20 may be secured to a surface 40 by creating an opening for the waterproof transmitter body 22 and mounting the top surface so that edge 26 is sealed to the surface 40 surrounding the opening 42. Surface 40 may be in an outdoor environment or otherwise exposed to water, for example, on a marine vessel or a land recreational vehicle. Threads 34 on the transmitter body are mated with complimentary threads in the surface opening 42 and fully rotated and seated to secure the transmitter therein, in a fixed position without further vertical movement. Edge 26 may include adhesive 21 or a gasket to make a seal with the surface 40 around opening 42, to create a watertight, corrosion resistance, flush installation in mounting surface 40.

Figure 1:
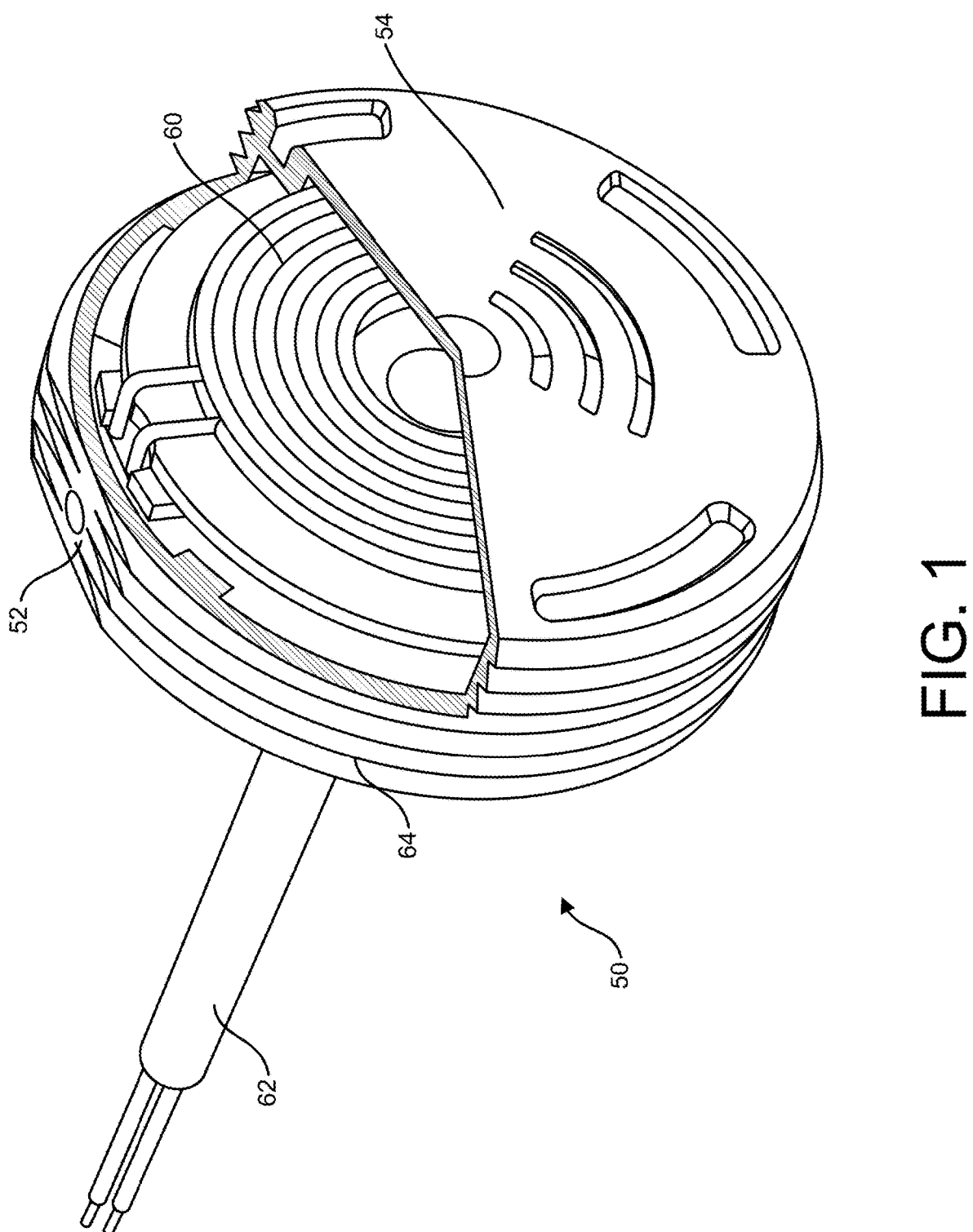
FIG. 1 is a perspective view showing an embodiment of the receiver, with partially removed top cover, for wirelessly providing live electrical power for a portable electrical device in a wet, harsh, or outdoor environment in the system and method of the present invention.
Figure 2:
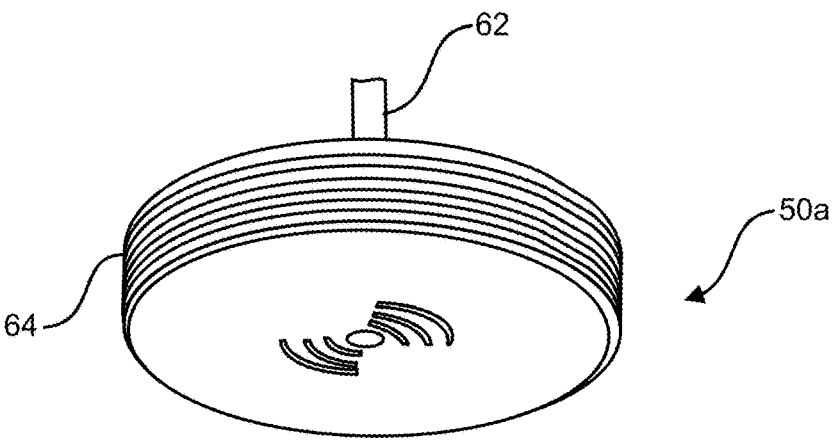
FIGS. 2-4 are perspective views of various sizes and configurations of the wireless receiver of FIG. 1.
Figure 3:
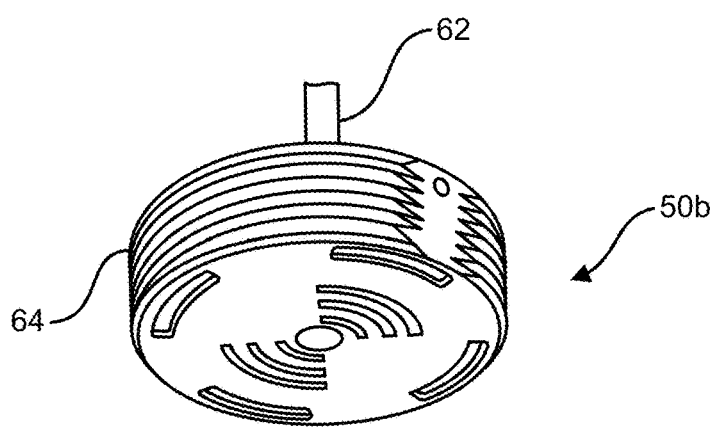
Figure 4:
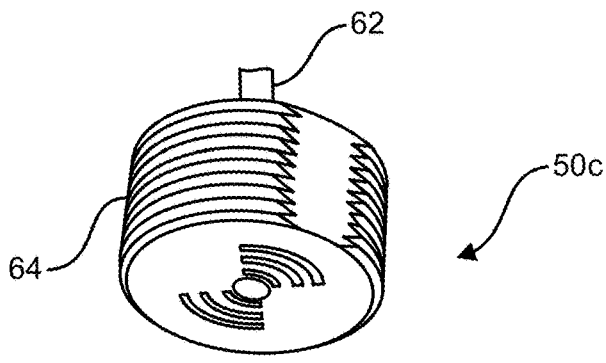

As shown in FIG. 1, the system and method of the present invention provides a wireless energy waterproof receiver 50 that has a cylindrical, puck-shaped waterproof body 52 (i.e., a waterproof housing), with threads 64 on the exterior cylindrical walls of the body extending from the top to the bottom of the body, and a flat, disk-like top surface 54.

Although similar in outward appearance to the body waterproof transmitter 20, waterproof receiver 50 is vertically adjustable in installation and use via rotation openings 56 in the top surface 54, unlike the fixed position of the transmitter. The waterproof receiver body 52 contains secondary coils and other circuitry 60 capable of receiving the electrical energy wirelessly from the primary circuit 30 of the transmitter, and converting it to electrical energy to be transmitted to an electrical device via power cord 62.

Figure 6:
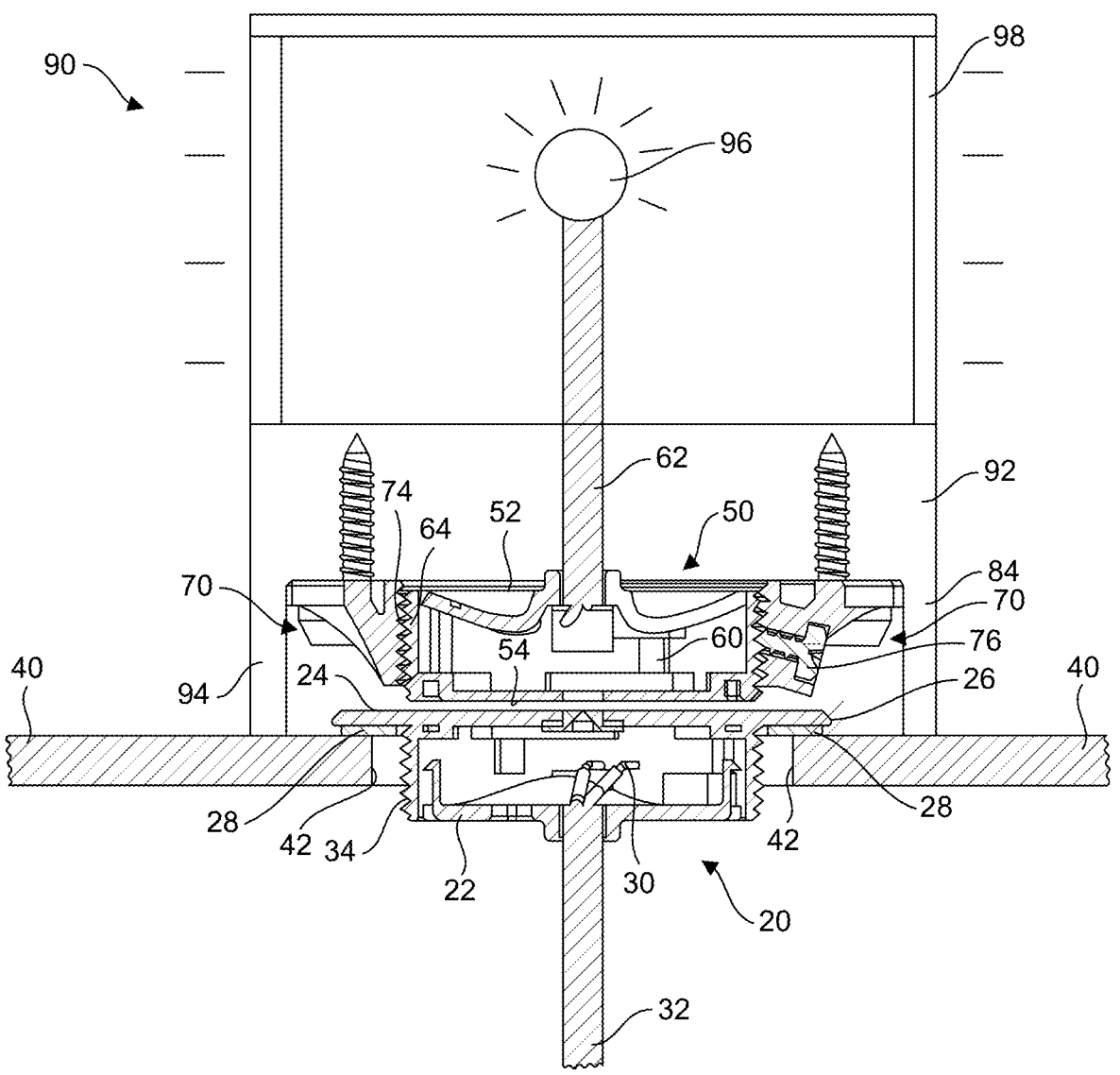
FIG. 6 is a cross-sectional elevational view of a portable electrical lamp incorporating the wireless power receiver of FIG. 1 and using the receiver housing and the wireless power transmitter of FIG. 5, for mounting in a surface of a vessel or land vehicle.
Figure 8:
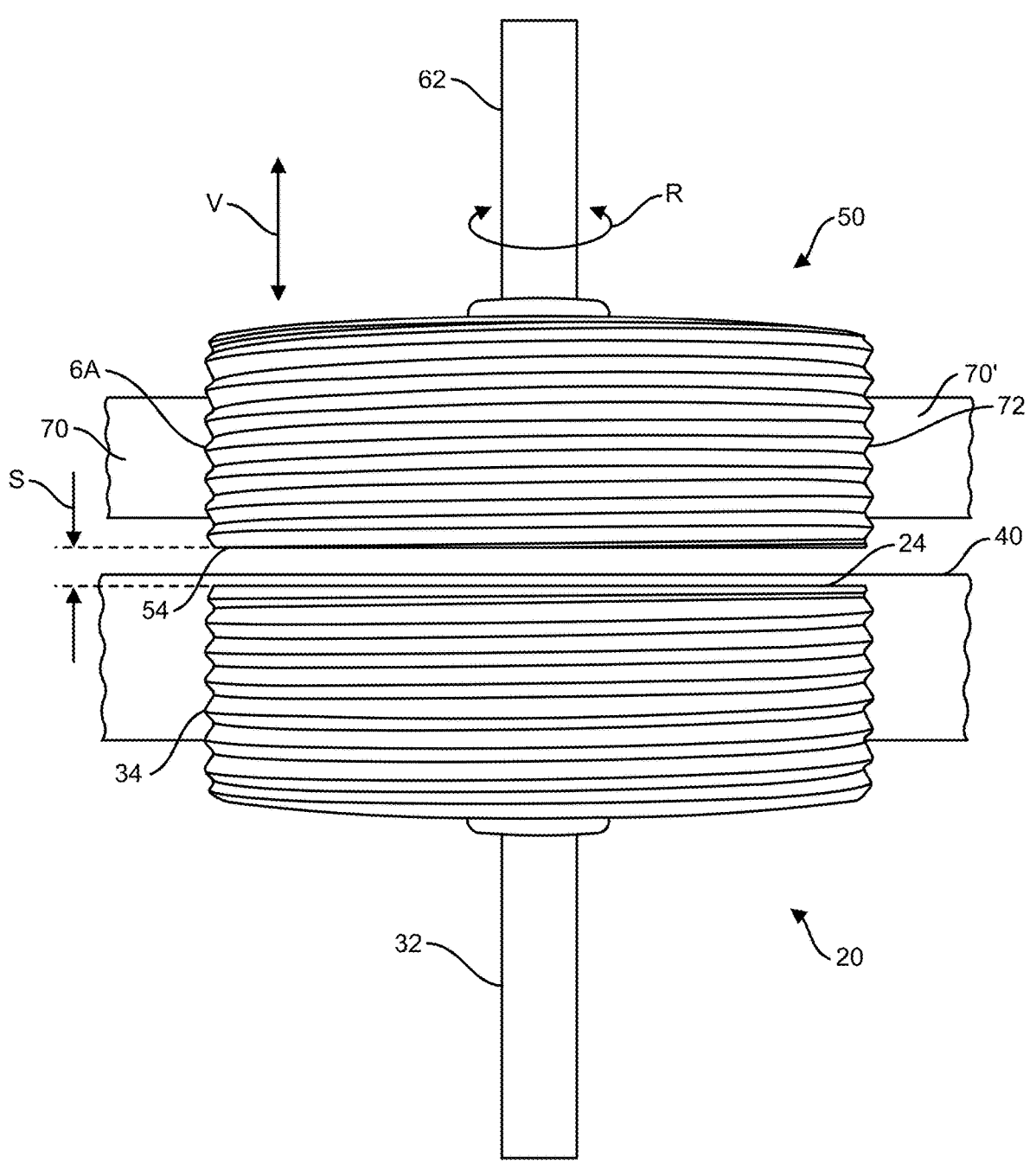
FIG. 8 is a side elevational view of the wireless transmitter and receiver of FIG. 5 at a predetermined spacing distance for transmitting and receiving electrical power.

The waterproof receiver 50 may be received within a housing 70, shown in FIGS. 5, 6 and 8 as a mounting ring, with an opening 72 for receiving waterproof receiver 50 and openings 78 for insertion of screws or other fasteners to secure the mounting ring to a device requiring power. The mounting ring opening 72 has complimentary threads 74 which match those of receiver 20 threaded therein, so that receiver body 52 may be rotated to change the position of the waterproof receiver 50 and vertically adjust it with respect to the mounting ring by rotation of the receiver. The fully-threaded receiver body 52 is free to be rotated and travel without limits in any direction within ring opening 72, up or down, subject only to the height of the body.

Figure 7:
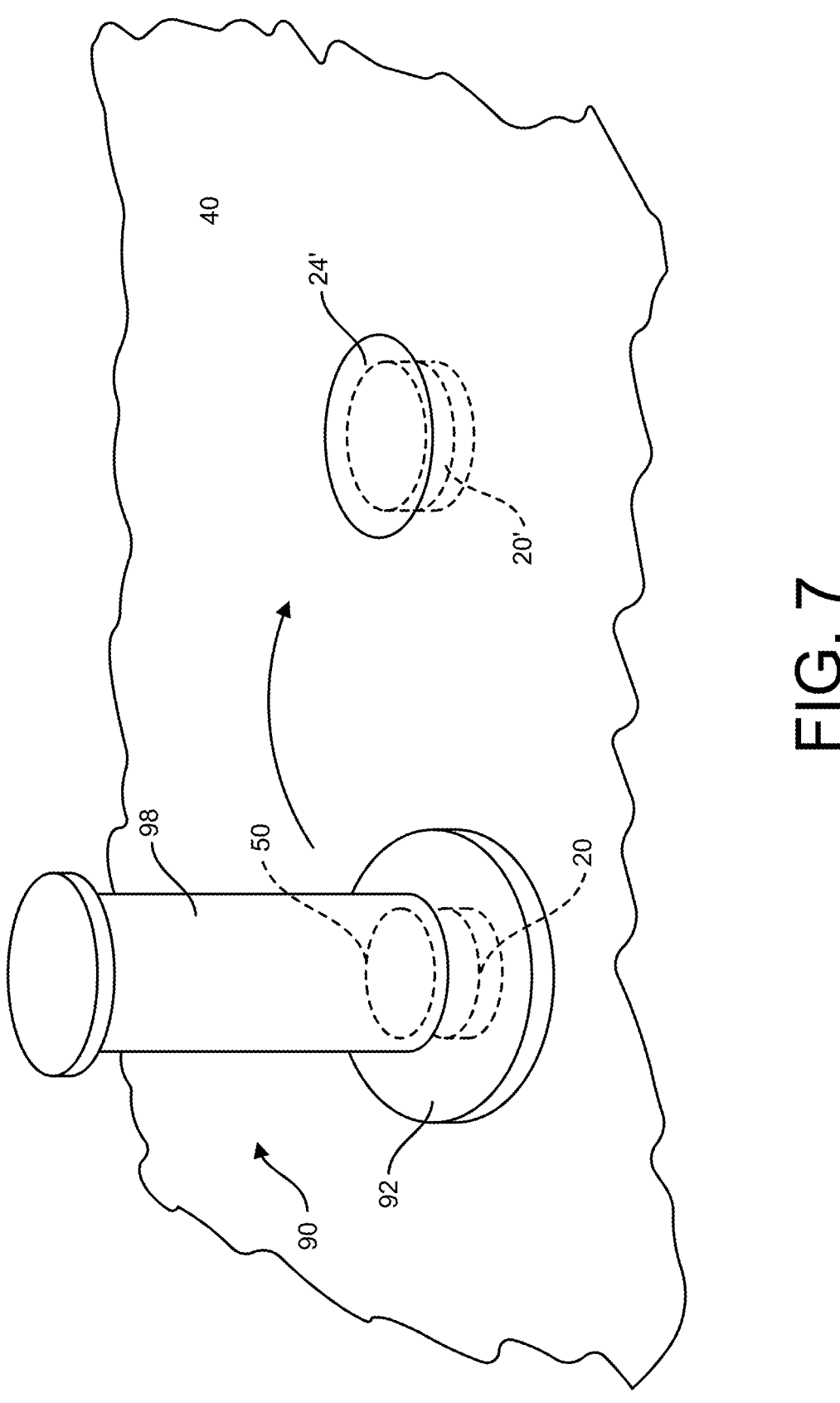
FIG. 7 is a perspective view of the portable electric lamp of FIG. 6 able to move between and be powered by multiple wireless power transmitters.

The mounting ring may be secured to the desired electrical device 90, shown in FIG. 6 as a lamp removably disposed and positioned above waterproof transmitter 20. Electrical lamp 90 as shown has body 92 with legs 94 sitting on surface 40, on either side of waterproof transmitter 20. Power cord 62 extends from waterproof receiver 50 and provides power to bulb 96, which emits light through lens 98. Mounting ring 70 is secured to the underside of device 90 by screws 80 extending through holes 78. Screws 80 may be tightened down on the electrical lamp body 92 with mounting screw washers 82, which allow for concentric float for the required alignment of receiver and top surfaces, 24, 54 in parallel orientation, as discussed further below. Electrical lamp 90 as shown is portable and not permanently affixed to surface 40, and may be moved by hand, without tools, from a position resting above one waterproof transmitter 20 to a position atop another waterproof transmitter 20', as shown in FIG. 7, and receive live power therefrom.

Figure 9:
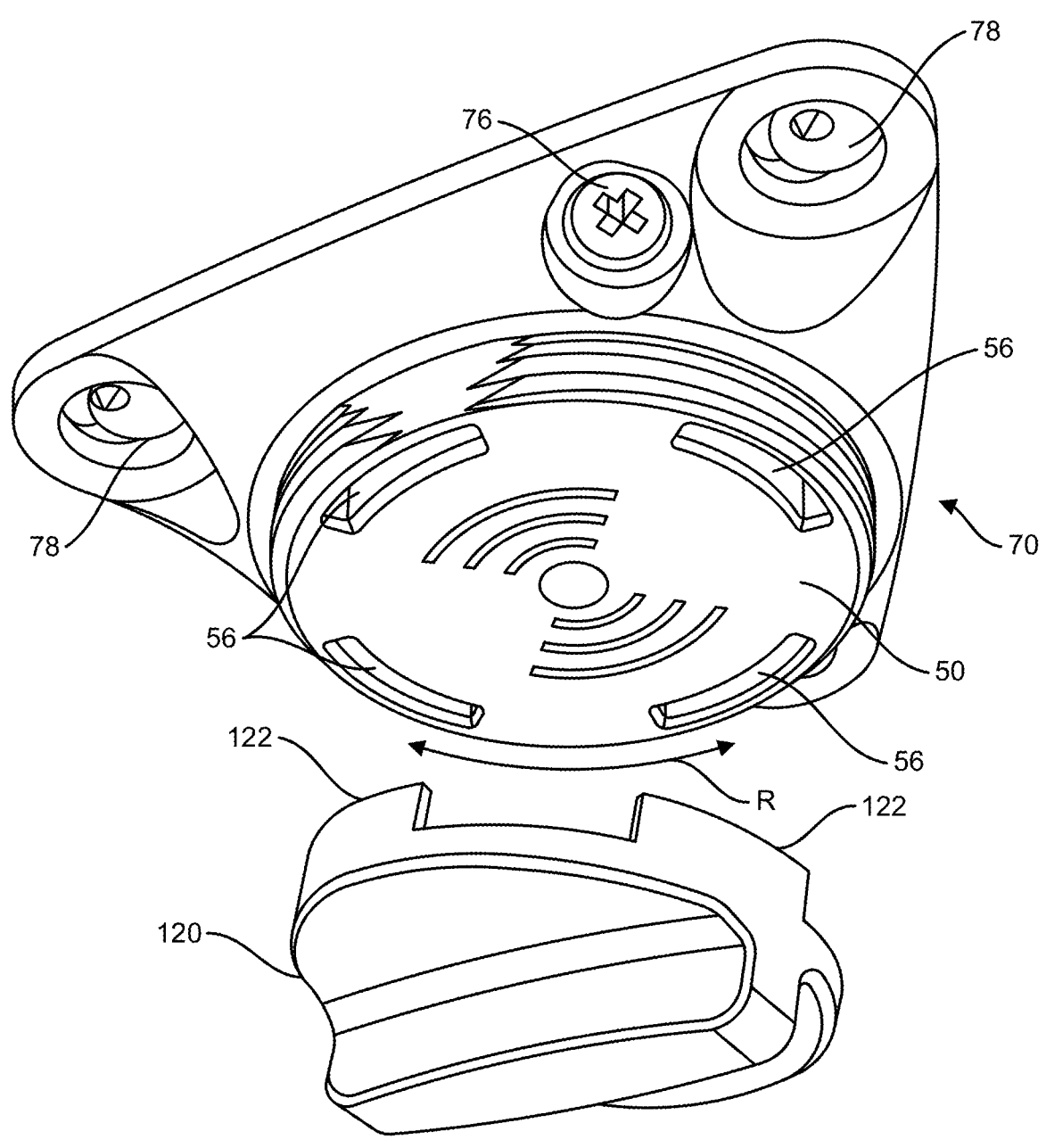
FIG. 9 is a perspective view of the receiver and receiver housing of FIG. 5, with a spacing adjustment tool for receiver rotation and vertical adjustment.
Figure 10:
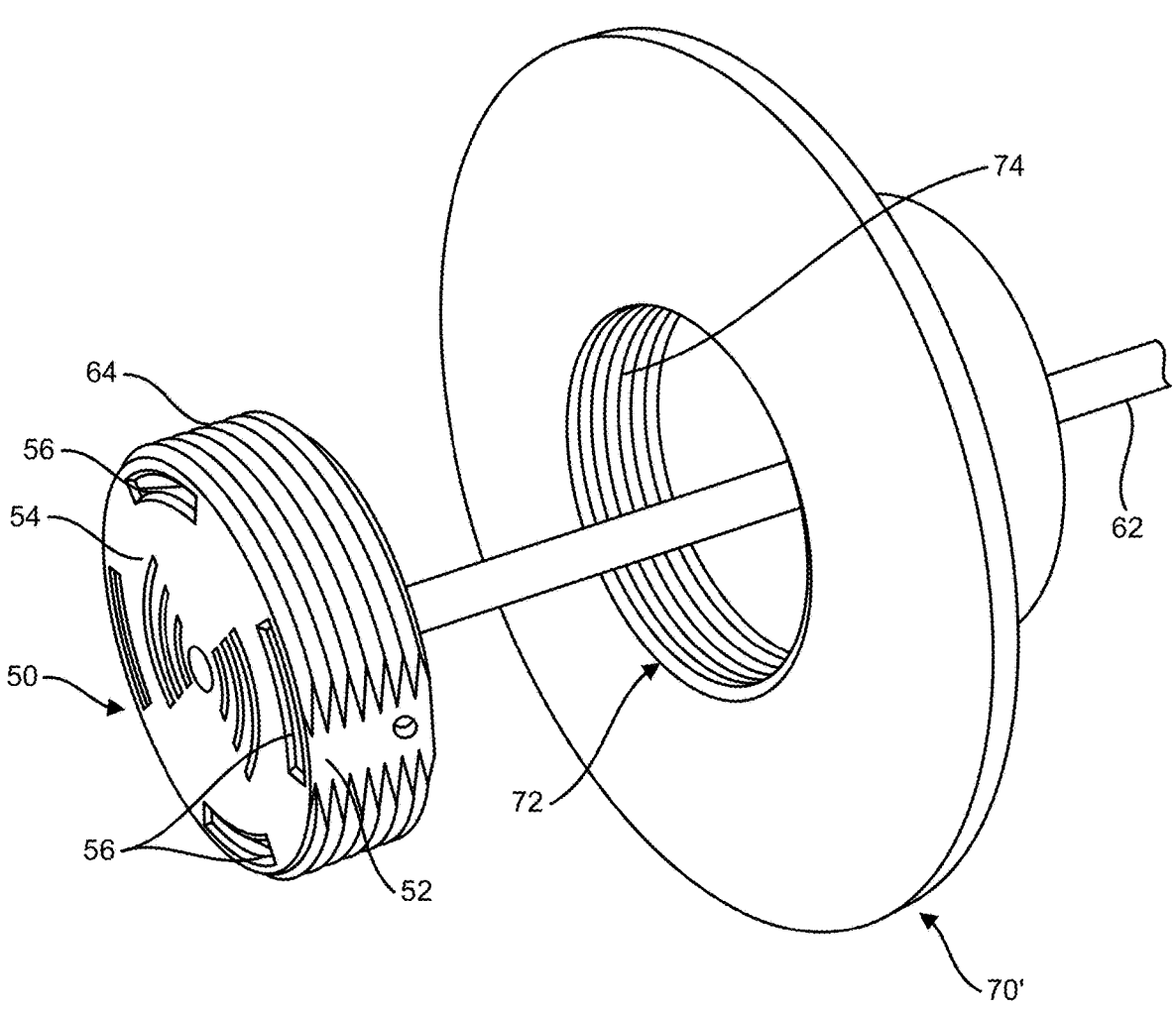
FIG. 10 is a perspective view of the receiver and an alternate embodiment of the receiver housing of the present invention.

The mounting housing for the receiver 50 may have various configurations to be secured in the electrical device to be powered, as shown also in mounting housing 70' in FIGS. 9 and 10. When the electrical device is moved or otherwise placed above the waterproof transmitter 20, waterproof receiver 50 must be positioned above and adjacent transmitter 20 and requires a desired vertical distance S and concentric alignment in order for wireless power transfer to commence and be maintained efficiently, as shown in FIG. 8. To achieve such spacing and alignment, the receiver 50 is adjustable with respect to waterproof transmitter 20 secured in a fixed position under surface 40. In the embodiment shown, transmitter waterproof receiver 50 is adjustably disposed with receiver threads 64 engaged with the complimentary threads in opening 72 of housing 70'. The receiver 20 is rotated back and forth in direction R to change the vertical position V of the receiver up and down within the mounting housing and to allow fine vertical adjustment of the finished distance S between the top surfaces of transmitter 20 and waterproof receiver 50. In the example shown, both transmitter 20 and receiver 50 have a diameter of about 35 mm (1.37 in.) and a height of about 11 mm (0.43 in.), and a spacing distance S of between about 0 and 2 mm (0-0.7 in.) between their respective top surfaces 24, 54 to achieve a maximum successful wireless power transfer between the transmitter and receiver.

A spacing adjustment tool 120 (FIG. 9) may be used to accomplish the receiver rotation and vertical adjustment. Tool 120 is generally circular and has prongs or tabs 122 which extend from the tool periphery and correspond in spacing and size with receiver rotation openings 56 in receiver top surface 54. The tool tabs 122 are inserted into the receiver openings 56, and the tool is rotated in back-and-forth directions R via handle 124 until the desired receiver/transmitter spacing is achieved.

To fix waterproof receiver 50 in the desired vertical position within the housing and spacing relative to transmitter 20, an anti-rotation locking or set screw 76 may be threadably disposed in the mounting ring 70 to be tightened against the waterproof receiver body 52 to secure the receiver against rotation and lock the vertical adjustment in place, and maintain the desired distance with the transmitter. As an alternative to threads, the receiver and housing may have complimentary fittings or fasteners to create the desired spacing distance between the receiver and the transmitter. A further alternative is to provide a complementary circular magnet array on the transmitter and/or receiver to provide a snap fit between the two, which positions them at the desired spacing and alignment.

In the example shown the voltage input to waterproof transmitter 20 by power cord 32 is in the range of about 12-24 VDC, although other voltages are possible, and the voltage output by the receiver 50 to the electrical device is comparable, such as 12 VDC. Power transmitted through the system to the electrical device is at any desired level capable of being wirelessly transmitted, such as up to about 5 W or more. Receiver 50 may be provided in different power levels, such as a 25 W at 12V receiver 50a (FIG. 2), 7 W at 12V receiver 50b (FIG. 3) and 3 W at 12V receiver 50c (FIG. 4), which have different body diameters and heights to accommodate the internal receiving circuitry.

Figure 11:
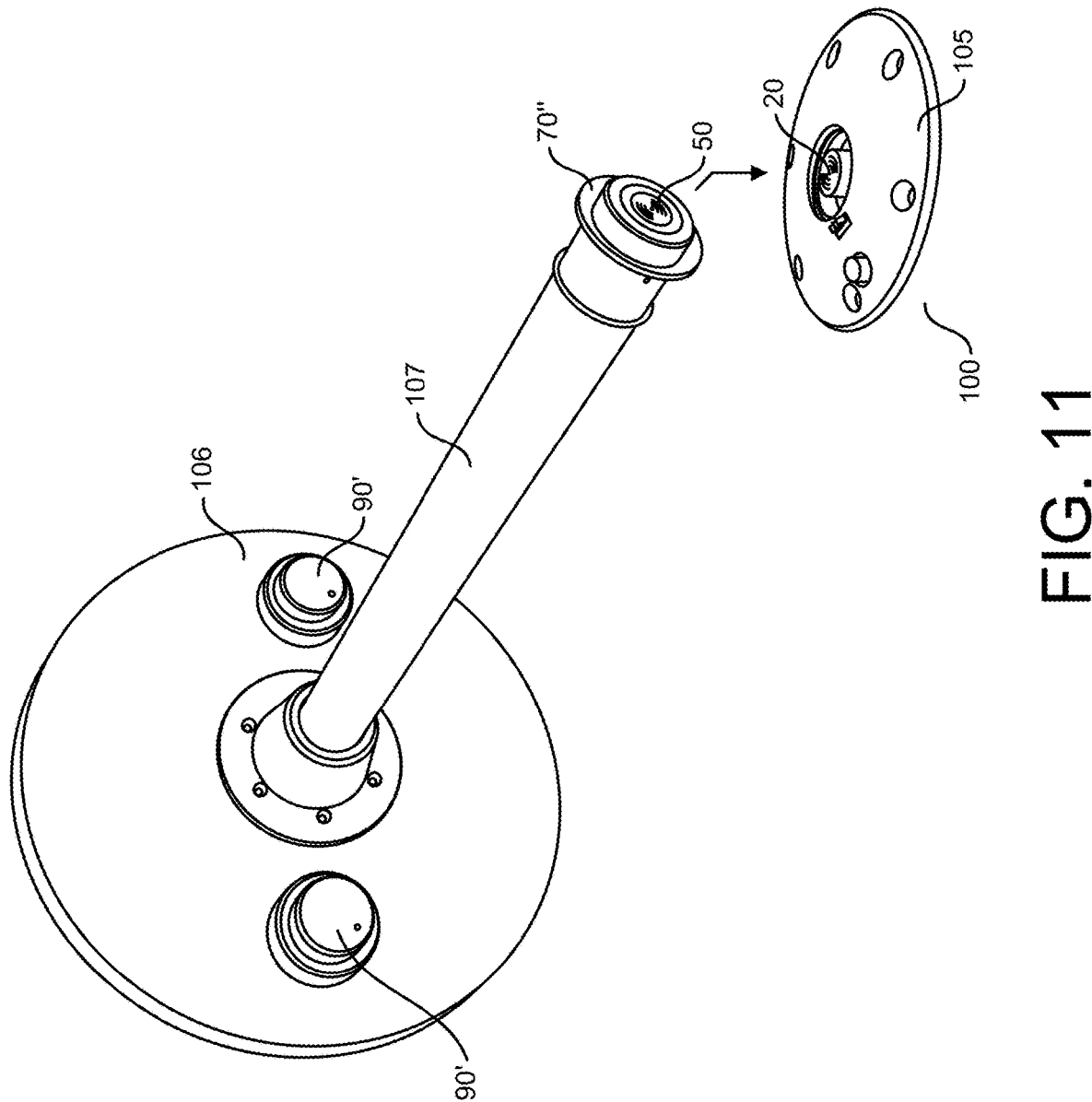
FIG. 11 is an embodiment of the present invention showing a wireless receiver incorporated into a removable table to power an electrical device thereon in a wet, harsh, or outdoor environment on a marine vessel or land vehicle.

In addition to the lamp device 90, the present invention may provide power to any device which is not permanently affixed to a surface and which may be moved in ordinary use to a position adjacent a different power transmitter to receive live power, or to a position remote from a transmitter, such as for storage. As shown in FIG. 11, for example, the lamp or other electrical device 90' may be in a removable table on a marine vessel or recreational vehicle 100. Transmitter 20 may be mounted in a fixed position in a housing in table base 105, which is secured to the vessel deck or floor. Waterproof receiver 50 may be mounting in housing 70" at the lower end of table leg 107, which as at its upper end table 106 with electrical devices 90' secured thereto. The lower end of table leg 107 containing housing 70" and waterproof receiver 50 may be removably secured to the table base 105 containing waterproof transmitter 20 on a floor surface of vessel or vehicle 100. The receiver and receiver housing and transmitter and table base are constructed to have the desired receiver/transmitter spacing for efficient power transfer.

Figure 12:
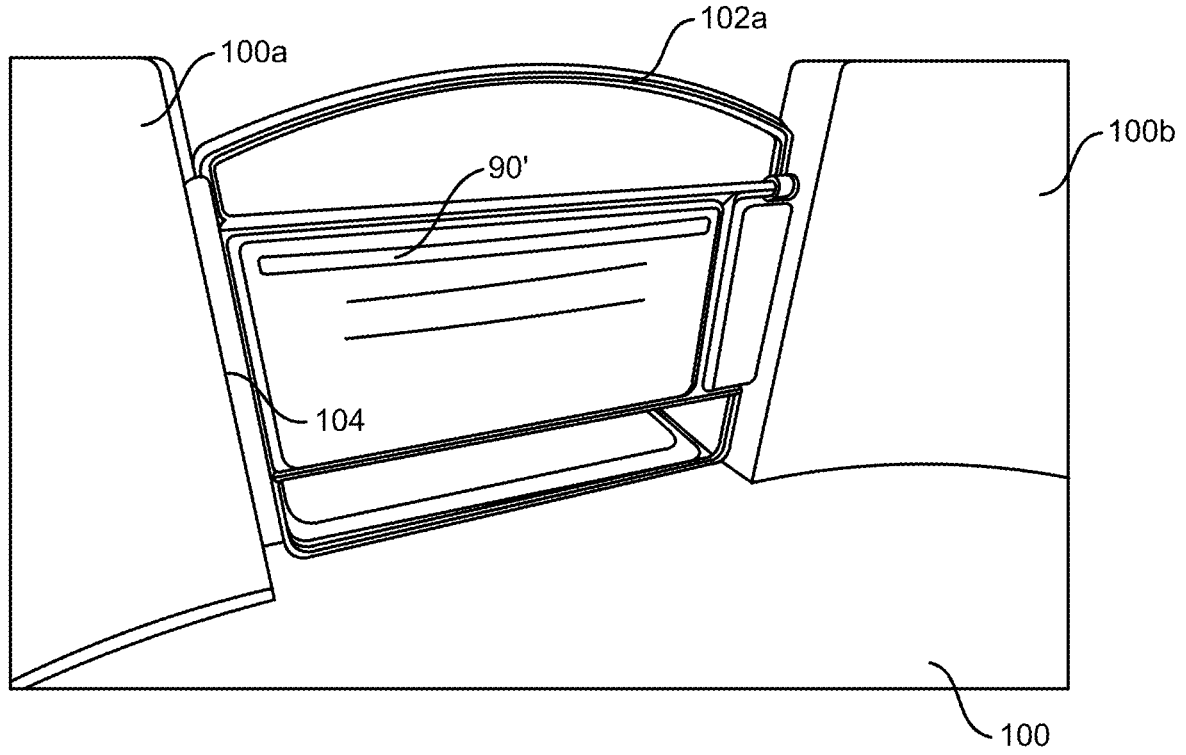
FIG. 12 is a perspective view of a swinging gate in the closed position on a marine vessel in a wet, harsh, or outdoor environment having an electric light powered by an embodiment of the wireless receiver of the present invention.
Figure 13:
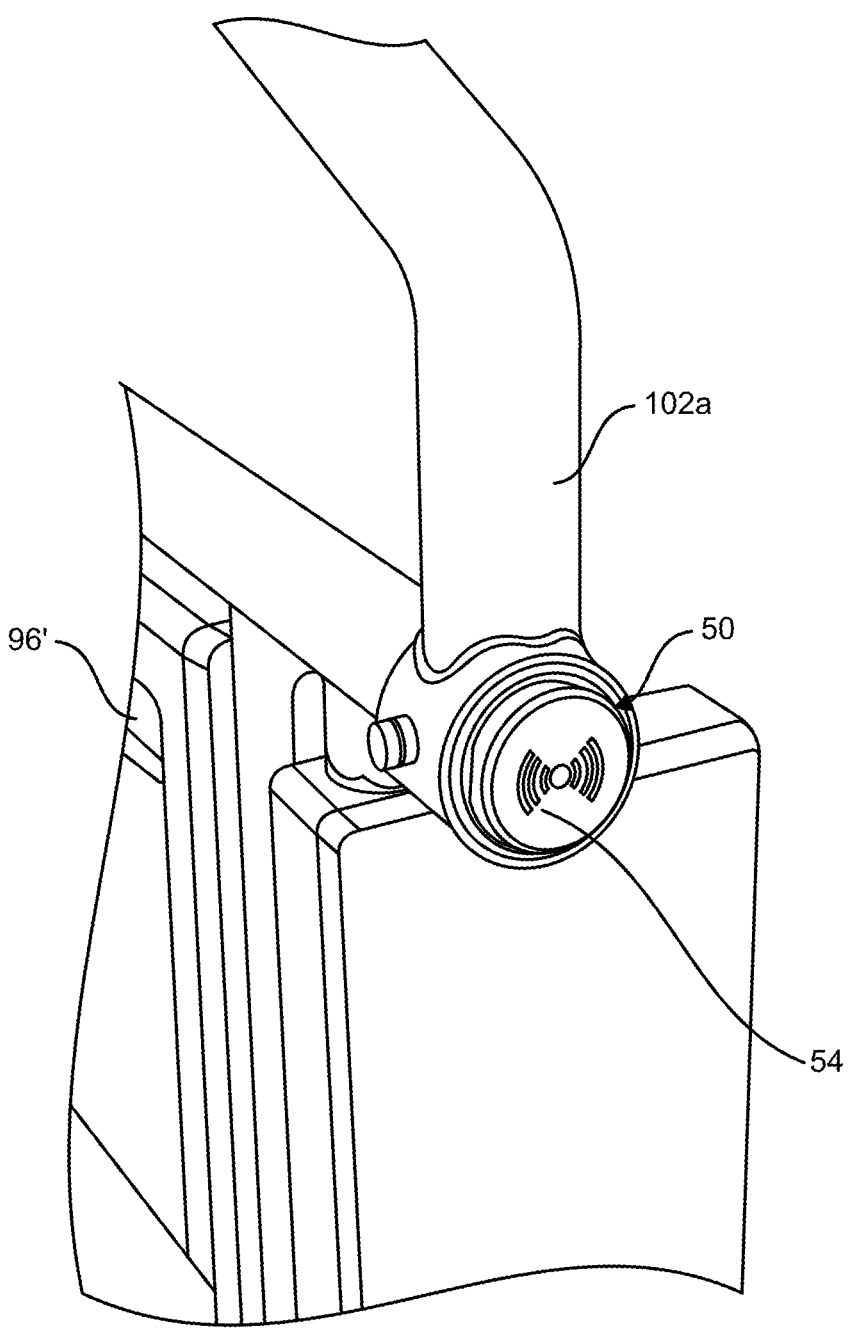
FIG. 13 is a perspective close-up of the receiver of FIG. 12 at the free end of the gate.
Figure 14:
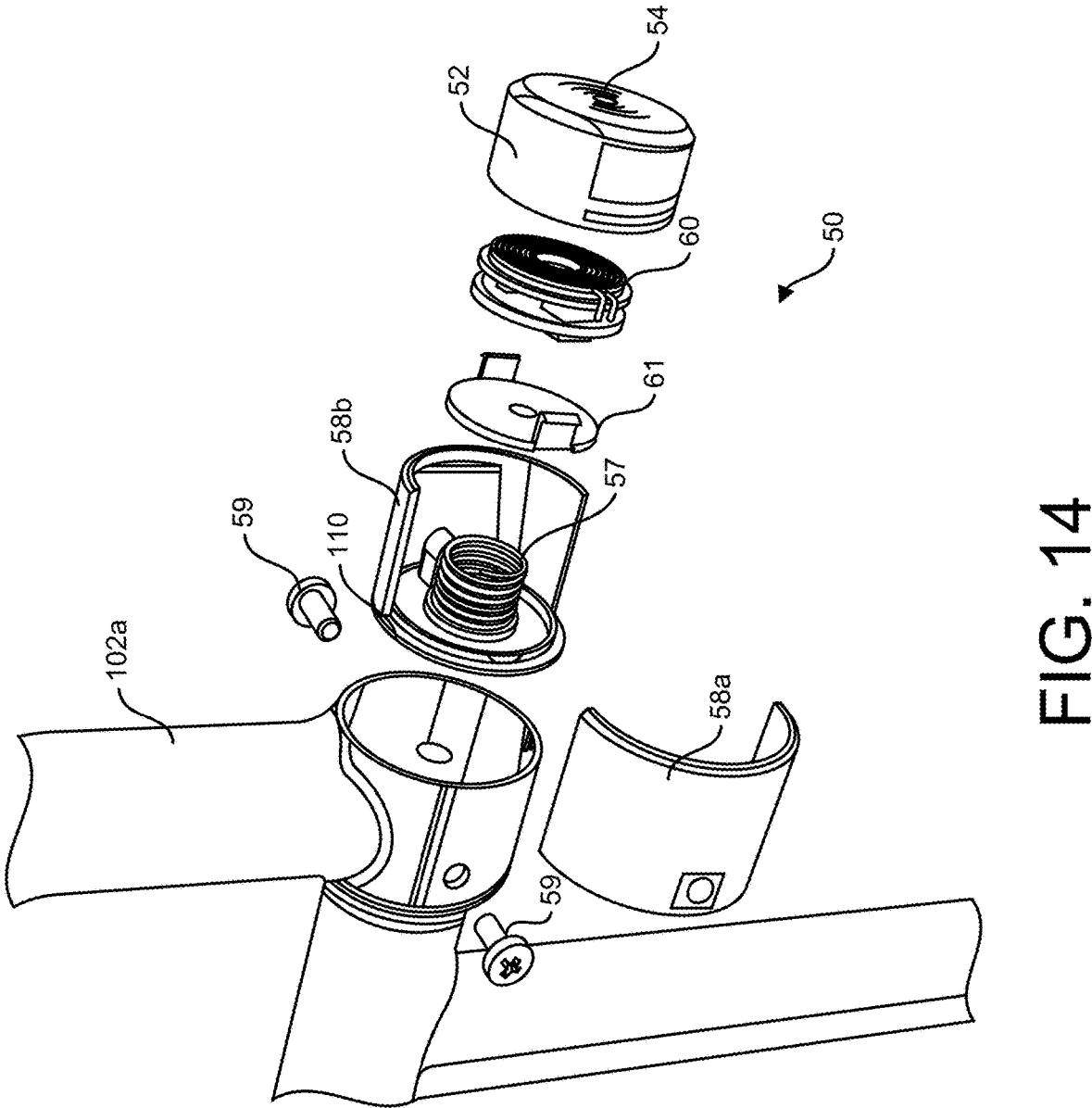
FIG. 14 is an exploded view of the receiver of FIG. 13.
Figure 15:
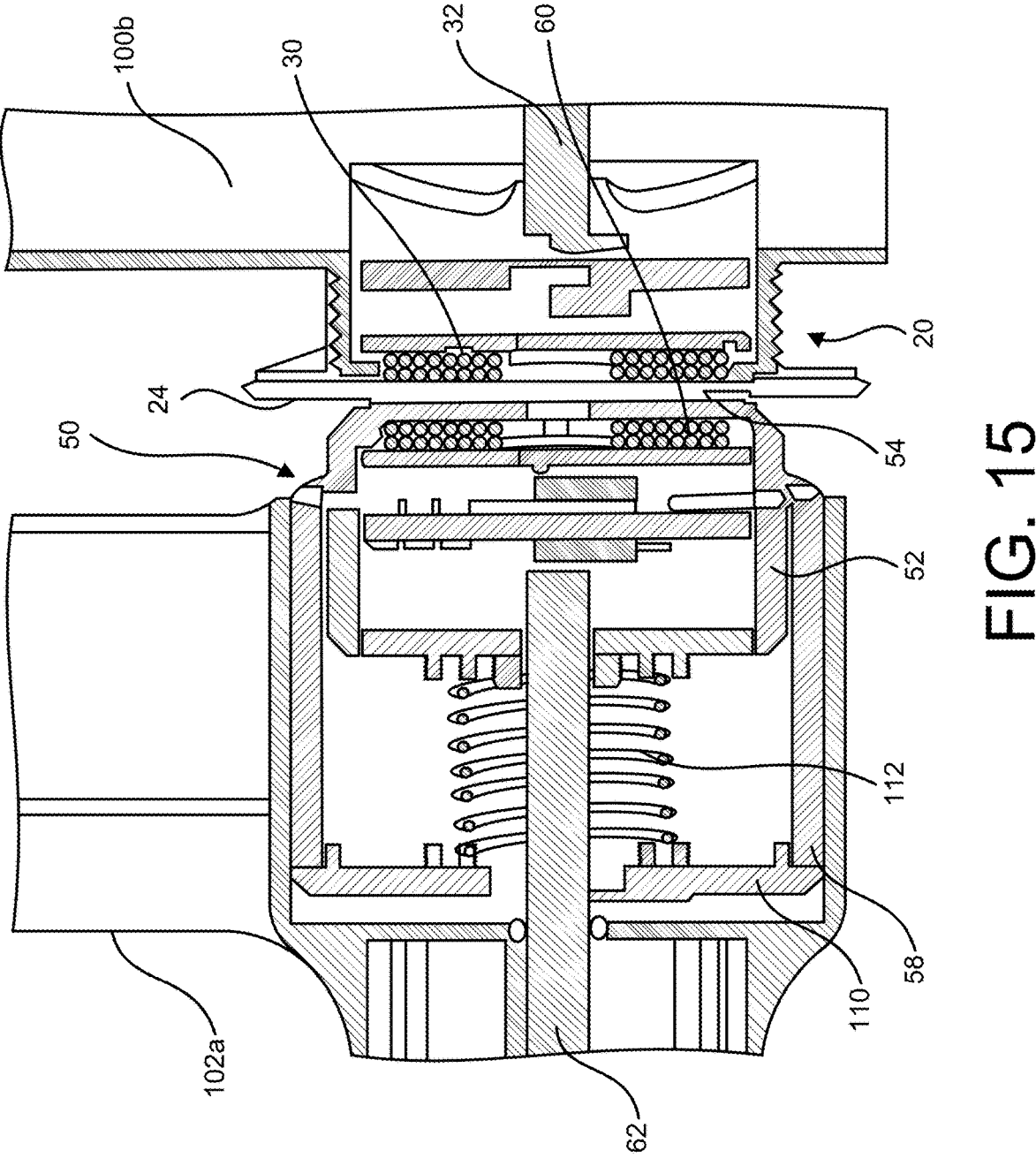
FIG. 15 is a cross-sectional view of the receiver in the gate of FIG. 12 coupled with a transmitter in the gate closed position.

In other examples, the electrical device 90 may be contained in a movable hatch, gate or door on the vessel or vehicle, in which case the transmitter is mounted to the non-moving component and the receiver is mounted on the movable component. The receiver is positioned at the desired position, spacing and alignment with the transmitter once the hatch, gate or door is closed, so that power may be then transmitted. One such embodiment is shown in FIGS. 12-14, where swinging gate 102a is mounted on hinges 104 on vessel wall 100a on one side of an opening, and closes against a latch mechanism mounted on vessel wall 100b on the other side of the opening. Receiver 50 is mounted on the latch side at the free end of the gate 102a, with transmitter 20 being disposed on the wall 100b. Receiver circuitry 60 and circuitry base 61 are disposed within waterproof receiver body 52, and the receiver is slidingly received within housing 110 made up of semi-cylindrical sleeve portions 58a, 58b and held in place in gate 102a by fasteners 59. In the gate-closed position (FIG. 15), receiver waterproof receiver body 52 is urged outward toward transmitter 20 by spring 112, so that the respective receiver and transmitter top surfaces 54, 24 make contact. At that point electrical power from transmitter power cord 32 sends power to receiver power cord, which is electrically connected to energize gate light strip 90'.

Figure 16:
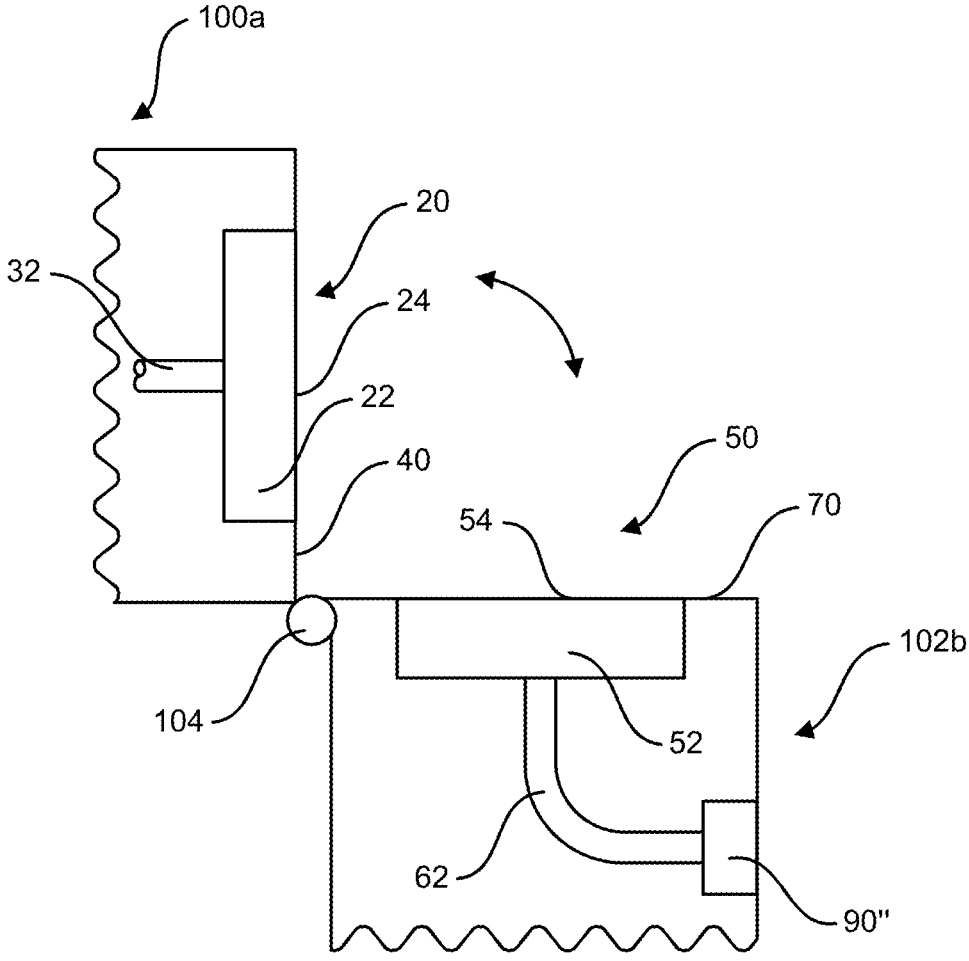
FIG. 16 is a cross-sectional view of a swinging gate of the type shown in FIG. 12, with an alternate embodiment of the receiver and receiver housing adjacent the hinge end of the gate in the open, unpowered position.
Figure 17:
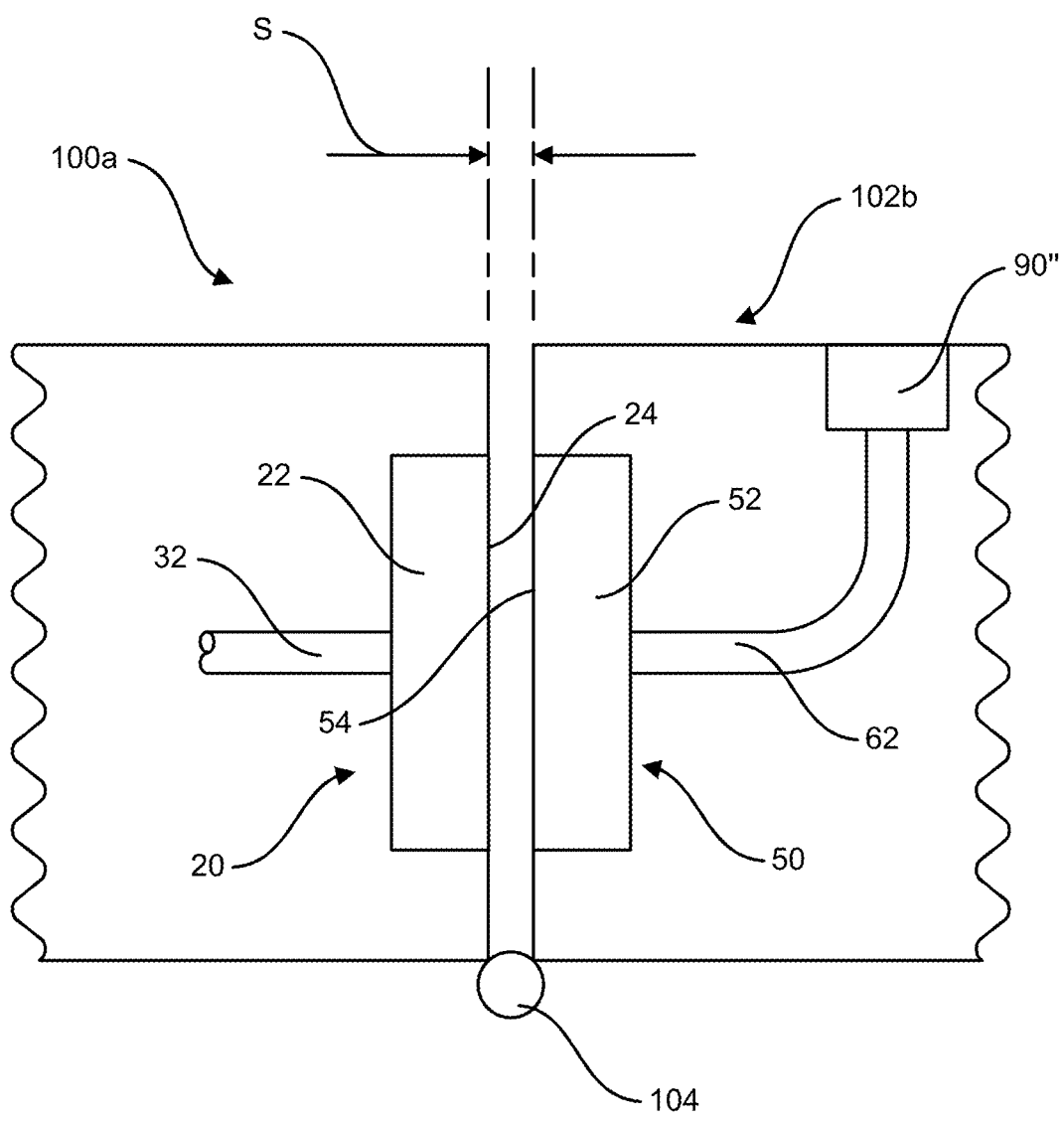
FIG. 17 is a cross-sectional view of a swinging gate of FIG. 16 in the closed, powered position to provide power wirelessly to a portable electrical device on the gate.
Figure 18:
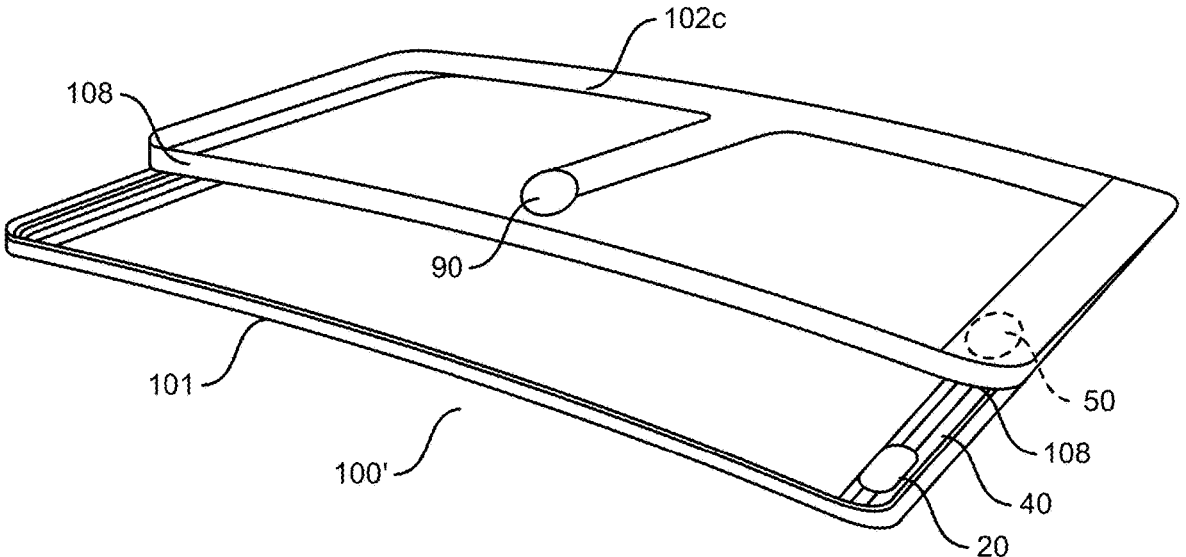
FIG. 18 is a perspective view of the receiver and receiver housing of the present invention mounted in a slideable hatch on a marine vessel or land vehicle.
Figure 19:
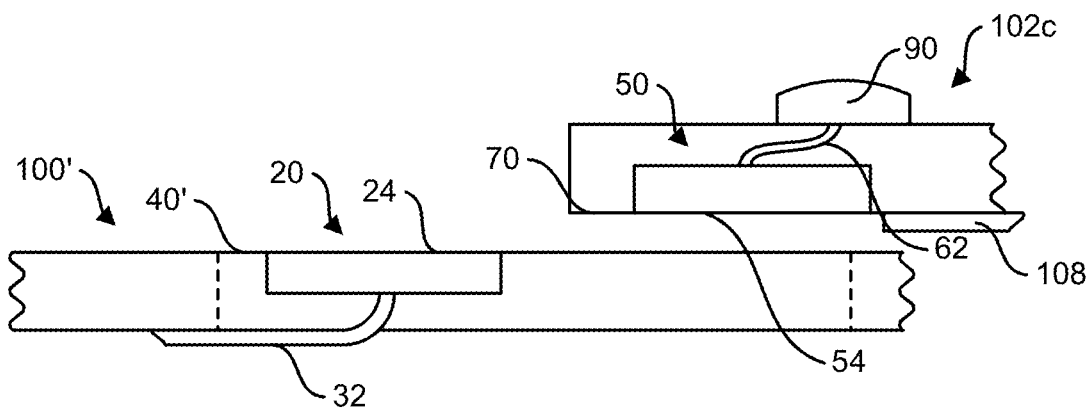
FIG. 19 is a cross-sectional elevational view of an embodiment of the receiver and receiver housing of the present invention, in the hatch of FIG. 18 in the hatch open (unpowered) position.
Figure 20:
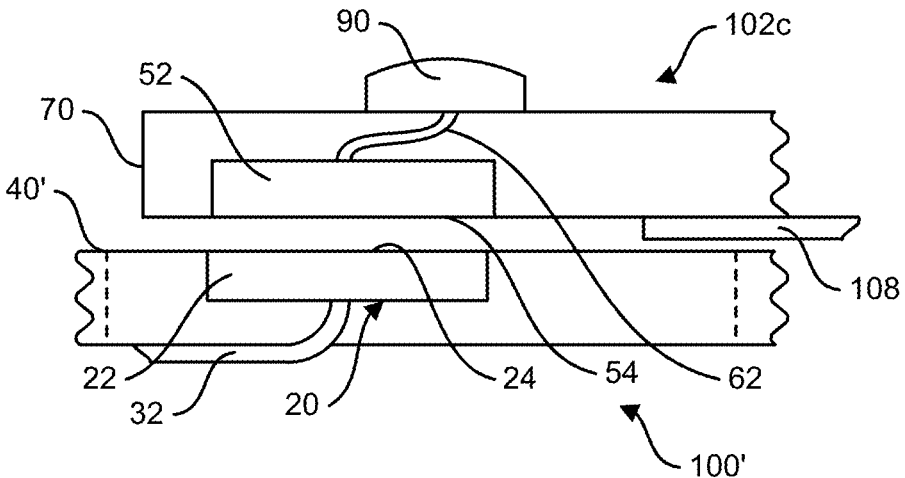
FIG. 20 is a cross-sectional elevational view of the receiver and receiver housing of FIG. 18 in the hatch closed (powered) position.

An alternate example of transmitting live power to an electrical device in a swinging gate is shown in FIGS. 16 and 17, where swinging gate 102b has waterproof transmitter body 22 of transmitter 20 mounted adjacent hinge 104, which is on vessel or vehicle 100b. In this embodiment the waterproof receiver body 52 of waterproof receiver 50 is mounted on vessel or vehicle 100b adjacent hinge 104, so that receiver 50 is able to rotate with respect to the transmitter 20 to an unpowered position (FIG. 16) to open the gate. When the gate 102b is in the closed position (FIG. 17), receiver 50 is aligned with transmitter 20, and the respective surfaces 54, 24 are spaced a desired distance S to efficiently transmit power to electrical lighting device 90".

A further example of transmitting live power to an electrical device in a moveable structure is shown in FIGS. 18-21. In FIGS. 18-21, there is shown a sliding hatch 102c, slideably moveable with respect to a framed opening 101 in a marine vessel or land recreational vehicle 100'. Receiver 50 may be mounted on a rail 108 on which hatch 102c slides open and closed with respect to the transmitter 20 mounted on fixed surface 40 adjacent frame 101. In all cases the waterproof receiver 50 and housing 70 may be moved from positions remote from the transmitter 20, where the electrical device is not powered (FIGS. 18 and 19), to a positions adjacent to and over the transmitter 20 (FIG. 20), which position has been pre-adjusted for the proper spacing and alignment to provide power to the electrical device 90.

Figure 21:
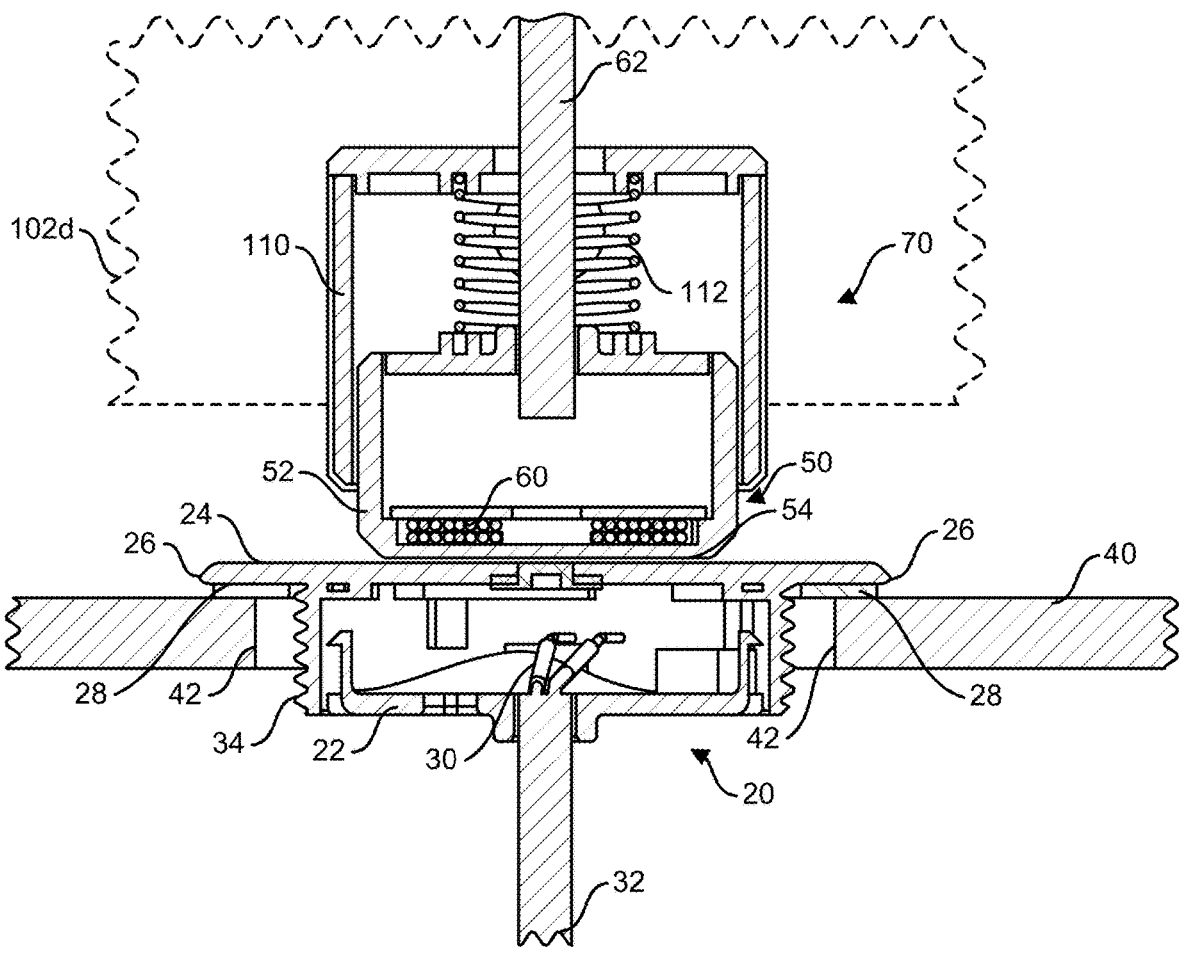
FIG. 21 is a cross-sectional elevational view of another embodiment of the receiver FIG. 19, for use in the hatch of FIG. 18, spring-loaded to contact the transmitter in the hatch closed (powered) position.

An alternate embodiment of receiver housing 70 mounted in a moveable or removable hatch or other structure 102d is shown in FIG. 21. Transmitter 20 is disposed in surface 40 in the same manner as shown in FIGS. 6, 8, 15-17, 19 and 20, but receiver 50 is disposed in housing 70 which here comprises a spring-loaded receiver structure 110, similar to the receiver 50 in the gate embodiment of FIGS. 13-15. Housing structure 110 as shown has cylindrical side walls, a closed end, and an open end, the latter through which receiver 50 extends. Waterproof receiver body 52 is slidably received in housing structure 110, and includes limiters (not shown) to prevent the receiver body from being removed in normal use from housing structure 110. Spring 112, disposed between the back of receiver 50 and the closed end of housing structure 110, urges receiver top surface 54 against transmitter top surface 24. In this embodiment the spacing between the transmitter and receiver is 0 mm, and any desired spacing between the transmitter and receiver circuitries 30, 60, respectively is accommodated by the thickness of the receiver top surface 54. This arrangement of maintaining the receiver in desired proximity to the transmitter when hatch 102 is in the closed position permits a degree of float in the receiver, for example about 4 mm (1.4 in.) to always take up the distance between the transmitter and receiver to ensure power transfer.

In using the aforedescribed receiver 50 and housing 70 with the wireless transmitter 20, one determines a desired spacing distance S (FIG. 8) between the receiver and the transmitter when the receiver and housing are to be a final position adjacent the transmitter. One then positions the receiver 50 in the housing 70 to provide the desired spacing distance between the receiver 50 and the transmitter 70. The moveable electrical device containing the receiver and housing is then positioned adjacent the transmitter, so that the receiver may receive wirelessly transferring electrical energy via an electromagnetic field from the transmitter to provide power to the electrical device. The receiver may be moved into final position by any number of methods, for example by placing the electrical device from a remote location onto a surface containing the transmitter, or by rotating or sliding the receiver into final position adjacent the transmitted.

Thus, the present invention provides the advantages of an improved system and method for employing a wireless receiver that provides power from a power source to an electrical device in a wet or outdoor environment, e.g., on a marine vessel or land recreational or other vehicle, such as marine light, with no exposed terminals that might corrode. The system and method of the present invention provide a waterproof power source that may be universally employed and is convenient to use in such environments, particularly useful for delivering live D.C. power to an electrical device, i.e., power to a device being actively used and other than mere battery charging. As such, it is particularly useful for powering devices that do not need to contain their own battery power source and are portable, i.e., easily moved from a between positions with power and to storage.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of wirelessly powering an electrical device comprising:
    providing a transmitter having a transmitter waterproof body and a primary circuit capable of creating an electromagnetic field to transfer electrical energy wirelessly to a secondary circuit;

identifying a mounting surface exposed to water, the mounting surface having an opening therein capable of receiving the transmitter waterproof body;
    securing the transmitter waterproof body in the opening of the mounting surface whereby an edge of the transmitter waterproof body is sealed to a portion of the mounting surface surrounding the opening to provide a waterproof transmitter having a watertight, corrosion resistant seal with the mounting surface;
    providing a receiver having a receiver waterproof body and a secondary circuit capable of receiving electrical energy wirelessly from the primary circuit of the waterproof transmitter;
    providing a housing having a housing opening capable of receiving the receiver waterproof body;
    securing the receiver waterproof body of the receiver in the housing opening, the receiver waterproof body being movable within the housing opening to change position of the receiver with respect to an exposed surface of the waterproof transmitter on the mounting surface;
    positioning the housing having the receiver therein adjacent the exposed surface of the waterproof transmitter on the mounting surface;
    adjusting the position of the receiver waterproof body within the housing opening to move the receiver and create a desired spacing distance between the receiver and the exposed surface of the waterproof transmitter;
    providing an electrical device requiring the energy in electrical communication with the receiver inside the housing; and
    wirelessly transferring electrical energy via an electromagnetic field from the waterproof transmitter to the receiver to provide power to the electrical device.

2. The method of claim 1 wherein the receiver waterproof body is vertically adjustable within the housing opening for vertically positioning the receiver and provide a desired vertical spacing distance between the receiver and the waterproof transmitter.

3. The method of claim 2 wherein in the step of adjusting the position of the receiver, the receiver waterproof body is rotatable within the housing opening to create the vertical desired spacing distance.

4. The method of claim 1 wherein the electrical device is attached to the housing containing the receiver.

5. The method of claim 4 wherein the electrical device is a portable electrical device having the receiver attached thereto, the portable electrical device is movable to make connection with the exposed surface of the waterproof transmitter at the mounting surface.

6. The method of claim 1 wherein the electrical device is permanently affixed to the mounting surface.

7. The method of claim 1 wherein the housing is attached to an underside of the electrical device.

8. The method of claim 1 further including a spacing adjustment tool adapted to connect to the receiver waterproof body for adjusting the position of the receiver waterproof body within the housing.

9. The method of claim 8 wherein the spacing adjustment tool has one or more prongs configured in a mating pattern with rotation openings on the receiver waterproof body.

10. The method of claim 1 further including providing a locking device for locking the receiver waterproof body in position for maintaining the desired spacing distance between the receiver and the waterproof transmitter.

11. The method of claim 10 wherein the locking device is selected from the group consisting of an anti-rotation locking device, fitted mating component, and complementary circular magnet arrays forming a snap fit connection.

12. The method of claim 1 wherein the waterproof transmitter comprises a first waterproof transmitter, the electrical device comprising a portable electrical device capable of being moved from the first waterproof transmitter to a second waterproof transmitter.

13. The method of claim 1 wherein the mounting surface comprises a table base exposed to water, the table base having the opening wherein the waterproof transmitter is mounted and resides therein.

14. The method of claim 13 wherein the housing comprises a table leg having a tabletop attached thereto, the electrical device is attached to the tabletop, the housing opening of the table leg comprising a lower end opening of the table leg, the waterproof receiver residing in the lower end opening of the table leg, whereby the table leg having the waterproof receiver is attached to the table base having the waterproof transmitter for transferring electrical energy via the electromagnetic field to provide power to the electrical device attached to the tabletop.

15. The method of claim 14 wherein the table base is secured to a marine vessel or recreational vehicle floor.

16. The method of claim 1 wherein the mounting surface having the waterproof transmitter mounted in the mounting surface opening comprises a non-moving component, and the housing having the receiver and the receiver waterproof body mounted in the housing opening comprises a movable component.

17. The method of claim 16 wherein the electrical device resides on the movable component.

18. The method of claim 16 wherein the desired spacing distance between the receiver and the exposed surface of the waterproof transmitter is obtained when the movable component is in a closed position with the non-moving component.

19. The method of claim 18 wherein the movable component comprises a movable hatch, gate, door, or spring-loaded removable structure on a marine vessel or recreational vehicle.

20. The method of claim 1 wherein the mounting surface having the waterproof transmitter mounted in the mounting surface opening comprises a movable component, and the housing having the receiver and the receiver waterproof body mounted in the housing opening comprises a non-moving component.

* * * * *